US012805461B2

(12) United States Patent
Park

(10) Patent No.: US 12,805,461 B2
(45) Date of Patent: Nov. 24, 2026

(54) APPARATUS FOR ADJUSTING VERTICAL SPACINGS BETWEEN PLANT CULTIVATION UNITS AND GUTTER HOLDERS MOVABLE UP AND DOWN

(71) Applicants: Green K-Farm Co., Ltd, Pyeongtaek-si (KR); Sang Woo Park, Dangjin-si (KR)

(72) Inventor: Sang Woo Park, Dangjin-si (KR)

(73) Assignees: Sang Woo Park, Dangjin-si (KR); Green K-Farm Co., Ltd, Pyeongtaek-si (KR)

( * ) Notice: Subject to any disclaimer, the term of this patent is extended or adjusted under 35 U.S.C. 154(b) by 12 days.

(21) Appl. No.: 18/938,334

(22) Filed: Nov. 6, 2024

(65) Prior Publication Data

US 2025/0380654 A1 Dec. 18, 2025

(30) Foreign Application Priority Data

Jun. 18, 2024 (KR) ........................ 10-2024-0078925

(51) Int. Cl.
*A01G 31/06* (2006.01)
*A01G 7/04* (2006.01)

(52) U.S. Cl.
CPC ............. *A01G 31/06* (2013.01); *A01G 7/045* (2013.01)

(58) Field of Classification Search
CPC .................. A01G 31/06; A01G 31/008; A01G 31/011; A01G 31/021; A01G 31/022; A01G 31/023; A01G 31/0231; A01G 31/0232; A01G 31/0233; A01G 31/024; A01G 31/025; A01G 7/045
See application file for complete search history.

(56) References Cited

U.S. PATENT DOCUMENTS

| | | | | |
|---|---|---|---|---|
| 6,848,877 B2 * | 2/2005 | Hendriks | A01G 31/045 | 414/281 |
| 9,832,938 B2 * | 12/2017 | Park | A01G 9/02 | |
| 10,349,585 B2 * | 7/2019 | Park | A01G 9/143 | |
| 11,483,988 B2 * | 11/2022 | Bertram | A01G 24/30 | |
| 2003/0223850 A1 * | 12/2003 | Hendriks | A01G 9/143 | 414/626 |

(Continued)

FOREIGN PATENT DOCUMENTS

| | | |
|---|---|---|
| KR | 200427183 Y1 | 9/2006 |
| KR | 101251903 B1 | 4/2013 |

(Continued)

*Primary Examiner* — Stanton L Krycinski
(74) *Attorney, Agent, or Firm* — NKL Law; Jae Youn Kim

(57) ABSTRACT

Provided is an apparatus for adjusting vertical spacings between plant cultivation units and gutter holders movable up and down, that, when growing plants in a multistage structure of 3-7 stages in height using sunlight or LED light in a greenhouse or a general commercial structure, allows workers to harvest the plants in an upper-stage plant cultivation unit in a natural posture by lowering the cultivation unit to the floor while maintaining horizontal balance without using a height-adjusting lift or a ladder to improve productivity and maximize manpower saving effects, and adjusts a vertical spacing between cultivation beds in the early stage of plant cultivation and at harvest time to promote growth of the plant and improve energy efficiency.

7 Claims, 13 Drawing Sheets

(56) References Cited

U.S. PATENT DOCUMENTS

| | | | | |
|---|---|---|---|---|
| 2015/0319936 | A1* | 11/2015 | Park | A01G 31/06 47/17 |
| 2022/0201926 | A1* | 6/2022 | Bertram | B25J 9/026 |
| 2024/0268288 | A1* | 8/2024 | Barth | A01G 31/045 |

FOREIGN PATENT DOCUMENTS

| | | | |
|---|---|---|---|
| KR | 20220064578 | A | 5/2022 |
| KR | 102421760 | B1 | 7/2022 |
| KR | 20230077307 | A | 6/2023 |

* cited by examiner

APPARATUS FOR ADJUSTING VERTICAL SPACINGS BETWEEN PLANT CULTIVATION UNITS AND GUTTER HOLDERS MOVABLE UP AND DOWN

BACKGROUND OF THE INVENTION

Field of the Invention

The present invention relates to an apparatus for adjusting vertical spacings between plant cultivation units and gutter holders movable up and down, and more particularly, to an apparatus that, when plants are growing in a multistage structure having 3 to 7 stages in height with sunlight or LED light in a greenhouse or general commercial structure, allows workers to harvest the plants in an upper-stage plant cultivation unit in a natural posture by lowering cultivation beds to the ground while maintaining horizontal balance without using a height-adjusting lift or a ladder to maximize productivity improvement and manpower saving effects, and adjusts a vertical spacing between gutter holders of the plant cultivation unit depending on growth of the plants in the early stage of plant cultivation and at harvest time to decrease or increase a space between LEDs and the plants to promote plant growth and improve energy efficiency.

Description of the Related Art

In general, a plant cultivation unit manufactured to grow vegetables or flowers is configured such that the inside of a plant gutter is filled with soil and vegetables or flowers are planted therein, and the vegetables or the flowers are watered periodically to ensure that the vegetables or the flowers are supplied with sufficient water.

Recently, since, in the case that a plurality of plant cultivation units is placed in a limited space, it is difficult to secure a space, a multistage plant cultivation system in which a plurality of plant cultivation units is spaced apart at a certain interval by supports, such as trusses, is used, that is, a plurality of plant cultivation units is stacked and used in an area in which one cultivation unit may be placed.

In the case of the conventional multistage plant cultivation system, the plant cultivation units are formed by a designated multistage frame, and when harvesting plants on an upper stage, a ladder or a lift must be installed so that workers are able to go up to the upper stage to harvest the plants, thereby causing inconvenience in harvesting the plants, and requiring a lot of manpower and a lot of work time.

However, conventionally, only one rack is installed on the plant cultivation unit, and thus, when a harvest line is stacked on the floor, a load is almost zero, and when the side line of the upper stage is under a high load, if the center of gravity is shifted to one side from a pinion gear due to a downward pressure, it is impossible to drive the rack, and if the plant cultivation unit tilts to one side due to the imbalance of the center of gravity, there is a serious problem that the plant cultivation unit must be reinstalled to structurally maintain the balance thereof again.

In addition, since a spacing between the plant cultivation units was conventionally fixed, energy efficiency increases when light from LEDs is supplied close to the plants in the early stage of plant growth, but there is no unit to adjust a vertical spacing between the LEDs and the plants in the state in which the plants are vertically spaced apart from the LEDs, and thus, problems, such as low energy efficiency during plant cultivation and unnecessary power loss, are encountered.

RELATED ART DOCUMENTS

Patent Documents (Patent Document 1) Korean Patent Registration No. 10-1251903 (Registration Date: Apr. 2, 2013)

(Patent Document 2) Korean Patent Laid-open Publication No. 10-2023-0077307 (Publication Date: Jun. 1, 2023)

(Patent Document 3) Korean Patent Registration No. 10-2421760 (Registration Date: Jul. 12, 2022)

SUMMARY OF THE INVENTION

Therefore, the present invention has been made in view of the above problems, and it is an object of the present invention to provide an apparatus for adjusting vertical spacings between plant cultivation units and between gutter holders movable up and down that, when harvesting plants in an upper-stage plant cultivation unit, may lower the upper-stage plant cultivation unit to the floor through upper and lower racks installed above the plant cultivation units and a pinion gear installed between the upper and lower racks, and thus allow workers to harvest the plants in the upper-stage plant cultivation unit in a natural posture in a no load state (stacked state) so as to improve productivity and maximize manpower saving effects.

It is another object of the present invention to provide an apparatus for adjusting vertical spacings between plant cultivation units and gutter holders movable up and down that may decrease or increase the vertical width of the gutter holders of stacked cultivation beds in the lowered state of an upper-stage plant cultivation unit so as to effectively utilize a cultivation unit area depending on the initial and harvesting growth situations of plants to improve energy efficiency.

To achieve the above objects of the present invention, an apparatus for adjusting vertical spacings between plant cultivation units and gutter holders movable up and down includes a driving unit, wire transfer units, the plant cultivation units, and vertical gutter holder spacing adjustment units.

First, the driving unit may be configured such that a motor die is installed between trusses, which are structures, a driving motor and a reduction gear are connected to the motor die, driving shafts provided with driving shaft connectors at both sides are continuously installed on a pinion gear shaft, an upper rack is installed at the upper part of a pinion gear and upper wire transfer pipes are installed at the ends of the upper rack, a lower rack is installed at the lower part of the pinion gear and lower wire transfer pipes are installed at the ends of the lower rack, and wires are firmly fixed laterally to wire triple-fastening insertion holes (wire fixing parts) by forming a plurality of holes in the wire transfer pipes so as to raise and lower the plant cultivation units.

Second, the wire transfer units may be configured such that the wire firmly fixed to the upper wire transfer pipe is fastened to the wire triple-fastening insertion holes and both sides of the wire are transferred in opposite directions to raise and lower the plant cultivation unit when two upper wire rollers are rotated around the wire fixing part, and the wire firmly fixed to the lower wire transfer pipe is fastened to the wire triple-fastening insertion holes and both sides of the wire are transferred in opposite directions to raise and lower the plant cultivation unit when two lower wire rollers are rotated around the wire fixing part, and may be configured such that, when the pinion gear is rotated, the upper rack moves rectilinearly to the right (or left) and the lower rack moves rectilinearly to the left (or right), cultivation beds raised by the upper rack and cultivation beds lowered by the upper rack, and cultivation beds lowered by the lower rack and cultivation beds raised by the lower rack are symmetrically arranged at the same ratio to achieve force balance.

Third, the plant cultivation units may be configured such that the plant cultivation units are divided into plant cultivation units when being raised and plant cultivation units when being lowered, when being raised, a turnbuckle cultivation bed caught in the wire is tied up, a transfer link is fixed to the gutter holders configured to support gutters for plant cultivation with fixing bolts, the transfer link is slid in the gutter holders to adjust the height of the gutter holders, and when a load is applied, the transfer link is fixed by a lower transfer link stop pin so that the gutters for plant cultivation of the respective layers receive the load from the upper layer and ascend in sequence, and when being lowered, the gutter holder of the lower end of the plant cultivation unit comes into contact with the floor, the transfer link connected to the gutter holder fixed to the layer just above is slidably inserted into the gutter holder of the lower end of the plant cultivation unit and comes into contact with the ends of the upper and lower gutter holders, and then, the gutter holder of the next upper layer is stacked in sequence.

Fourth, the vertical gutter holder spacing adjustment units may be configured such that a plurality of stop pin holes configured to adjust a spacing between cultivation layers is formed in the gutter holders, a long vertical hole is formed in the transfer link inserted into the gutter holders, and when the stop pin is inserted into the stop pin hole located at a desired position while the transfer link is moved up and down, the stop pin is inserted and fixed into the long hole of the transfer link through the stop pin hole, thereby decreasing the spacing between the cultivation layers in the early stage of growth and increasing the spacing as the plants grow, and thus achieving energy and production convenience.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, embodiments of the present invention will be described in detail with reference to the accompanying drawings.

Figure 1:
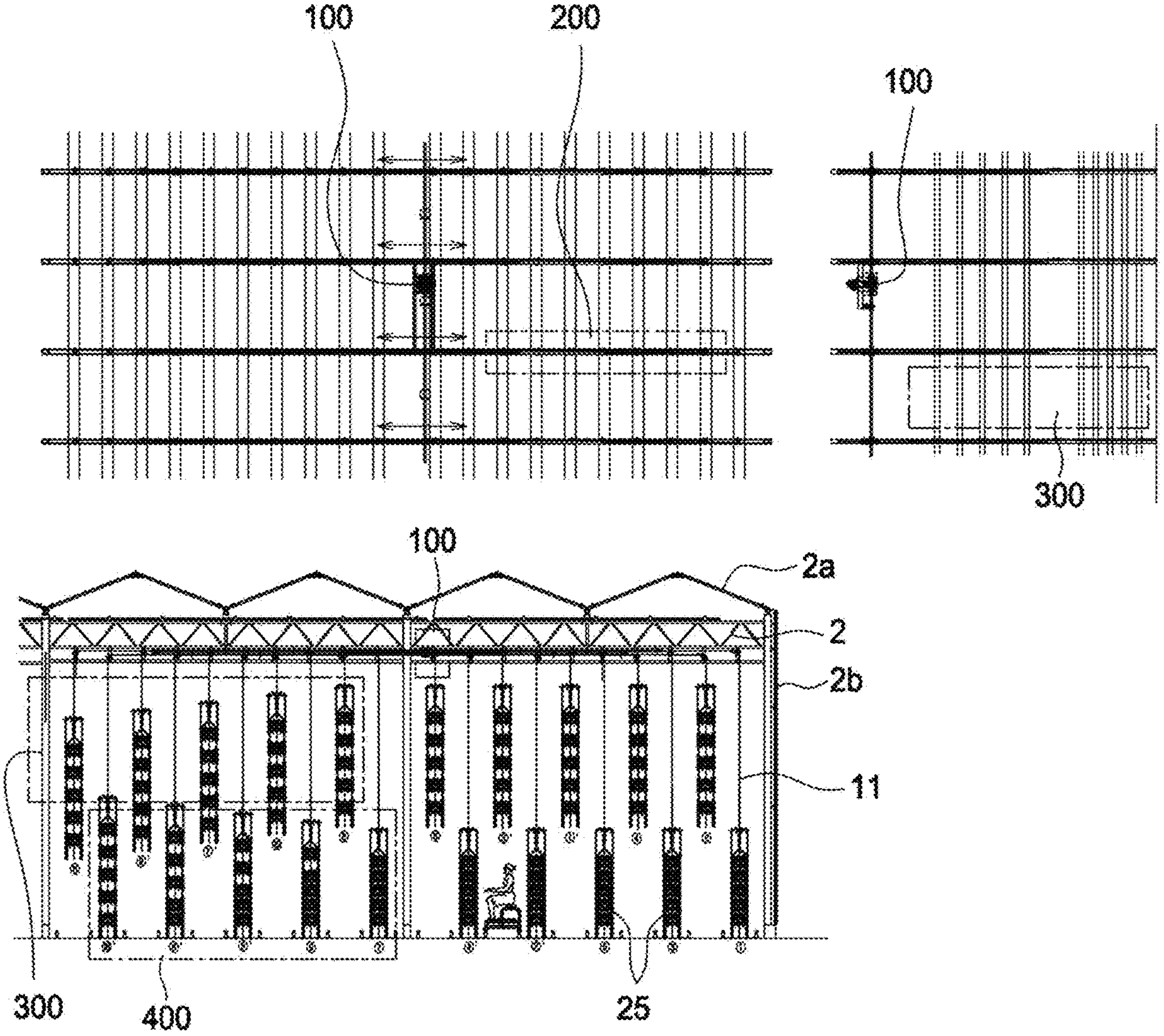
FIG. 1 is a view showing the overall configuration of a plant cultivation unit of the present invention.
Figure 2:
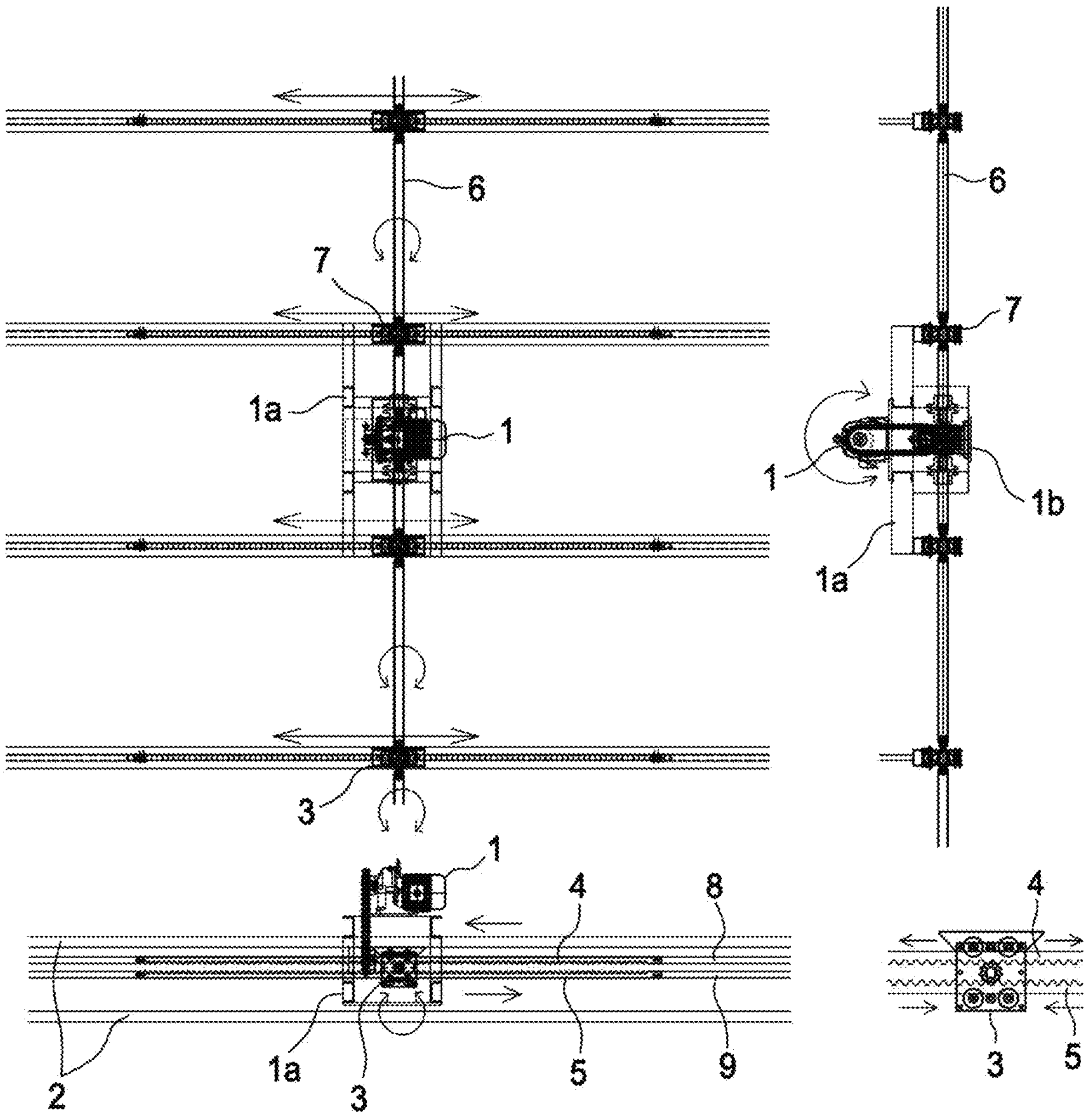
FIG. 2 is a view showing the configuration of a driving unit of the present invention.
Figure 3:
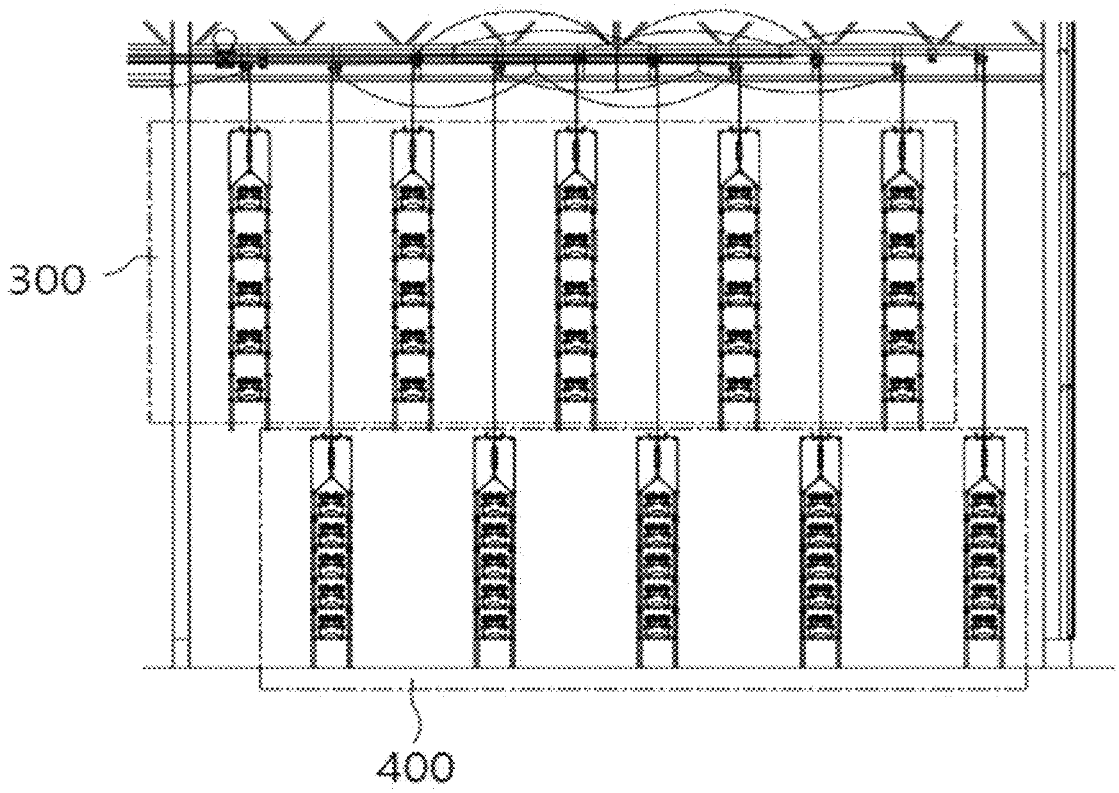
FIG. 3 is a view showing the unstacked state of the plant cultivation unit and the stacked state of a cultivation bed stack unit.
Figure 4:
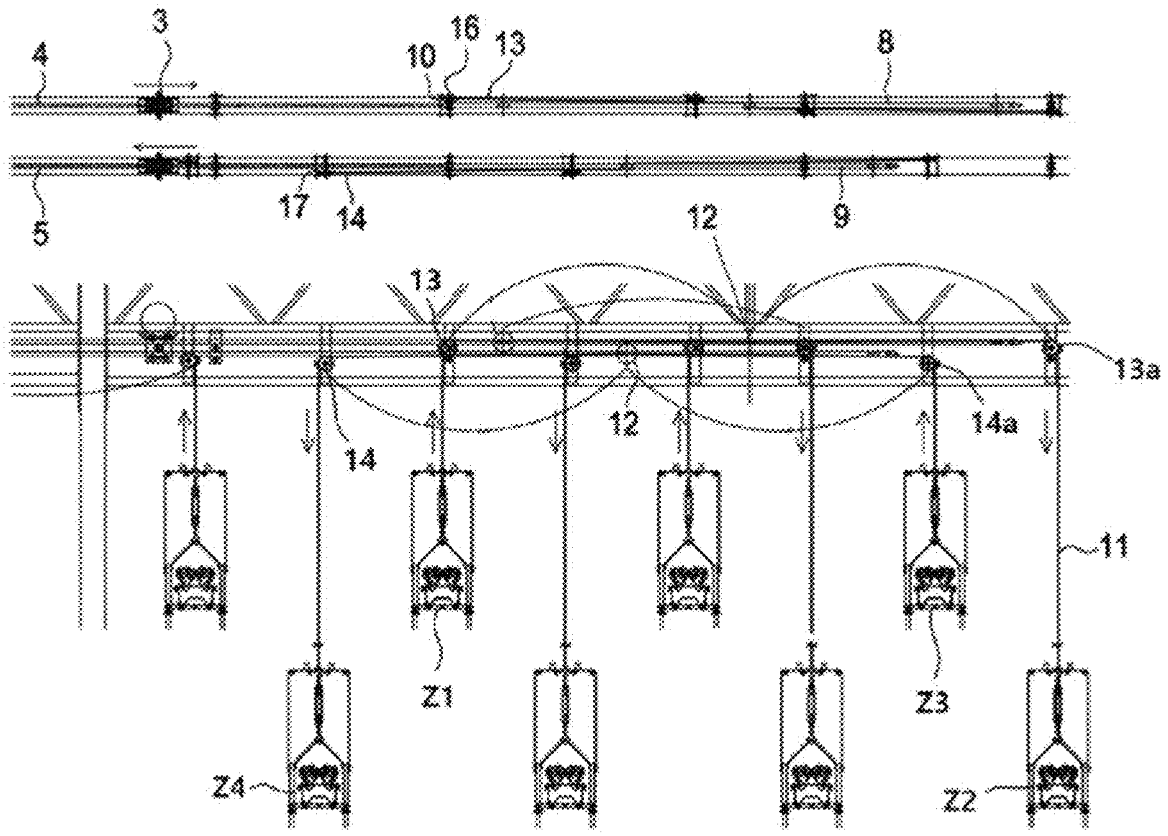
FIGS. 4 and 5 are views illustrating a principle of balanced up and down movement of cultivation beds of the present invention.
Figure 5:
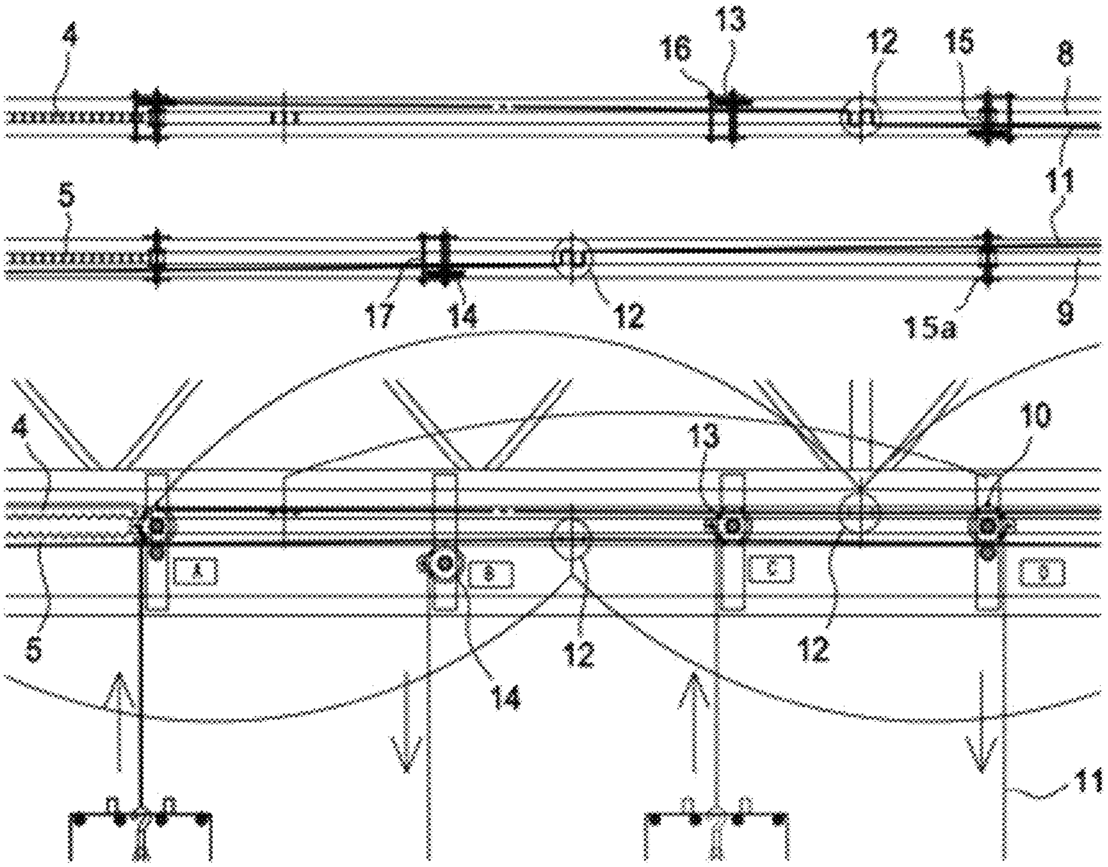
Figure 6:
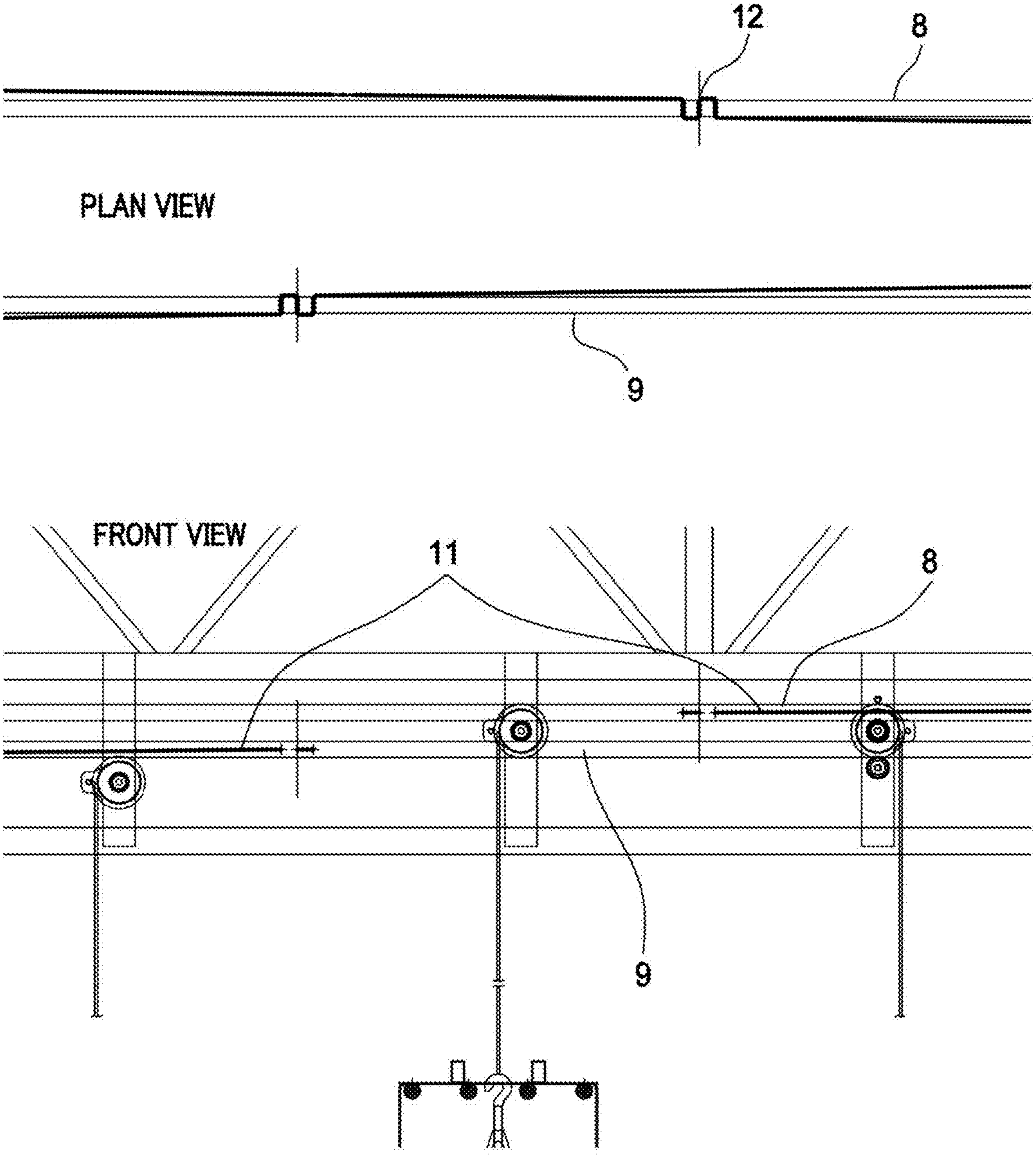
FIG. 6 is a view illustrating a wire fixing unit of the present invention.
Figure 7:
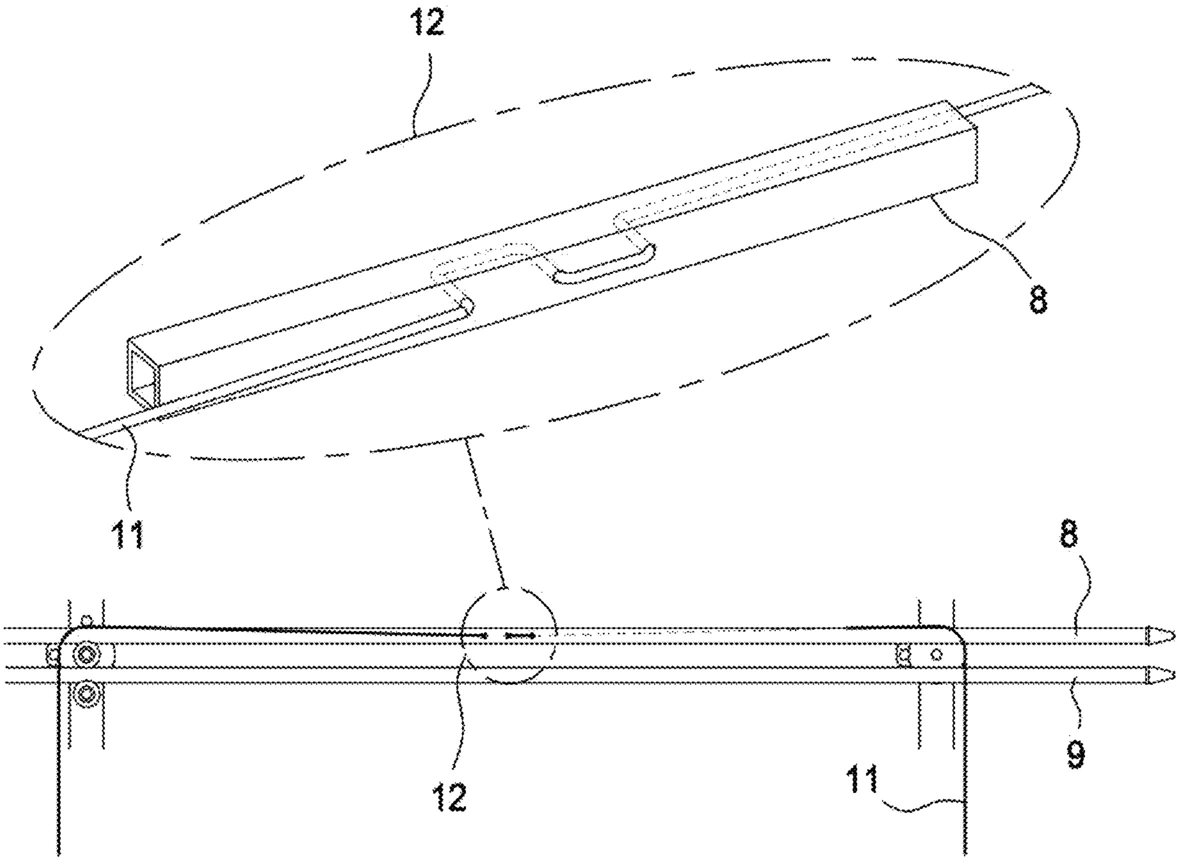
FIG. 7 is a detailed view showing the wire fixing unit of the present invention.
Figure 8A:
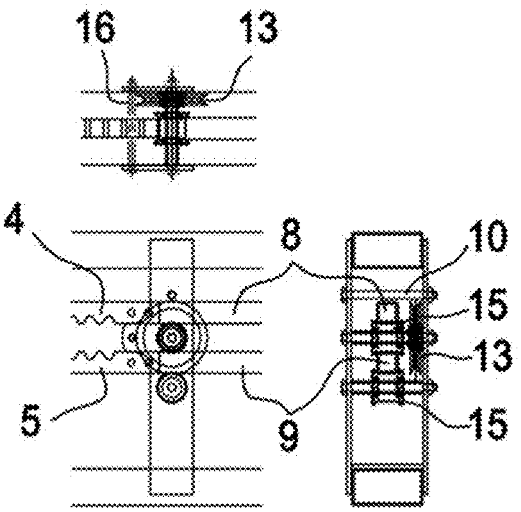
FIGS. 8(*a*) to 8(*d*) are detailed views of portions A to D of FIG. 5.
Figure 8B:
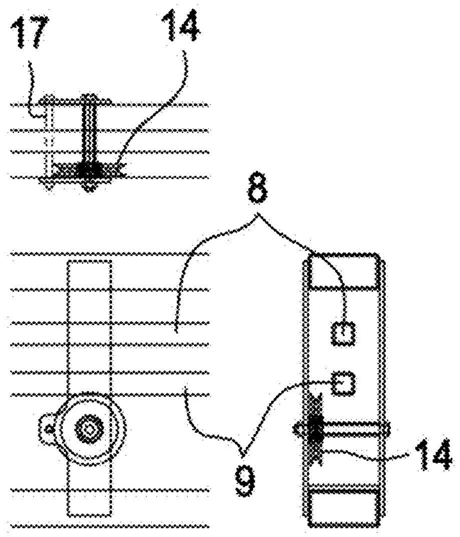
Figure 8C:
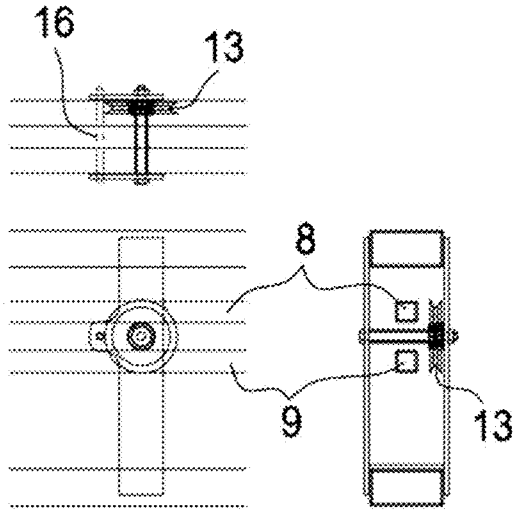
Figure 8D:
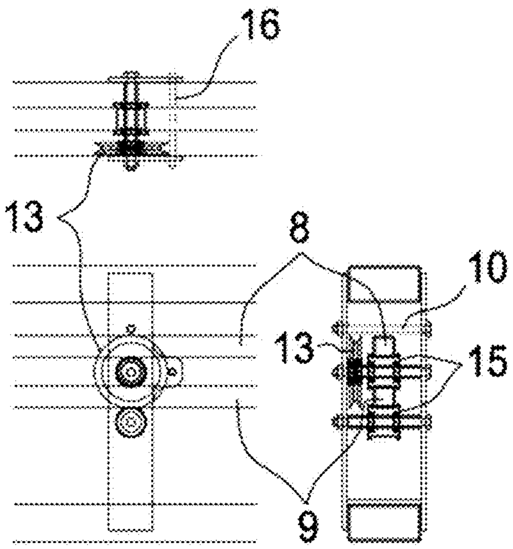
Figure 9A:
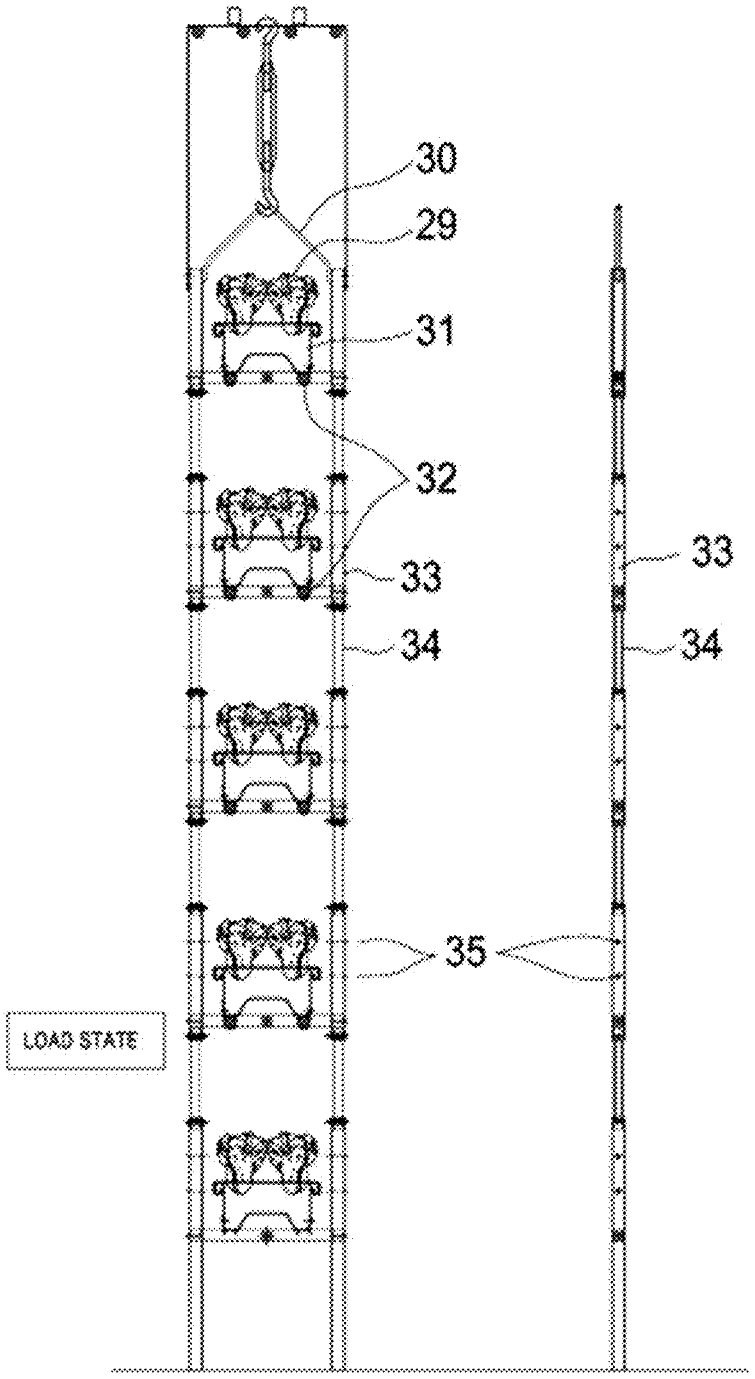
FIGS. 9(*a*) and 9(*b*) are views showing an apparatus for adjusting a vertical spacing between the cultivation beds of the present invention in a load state and a no load state, respectively.
Figure 9B:
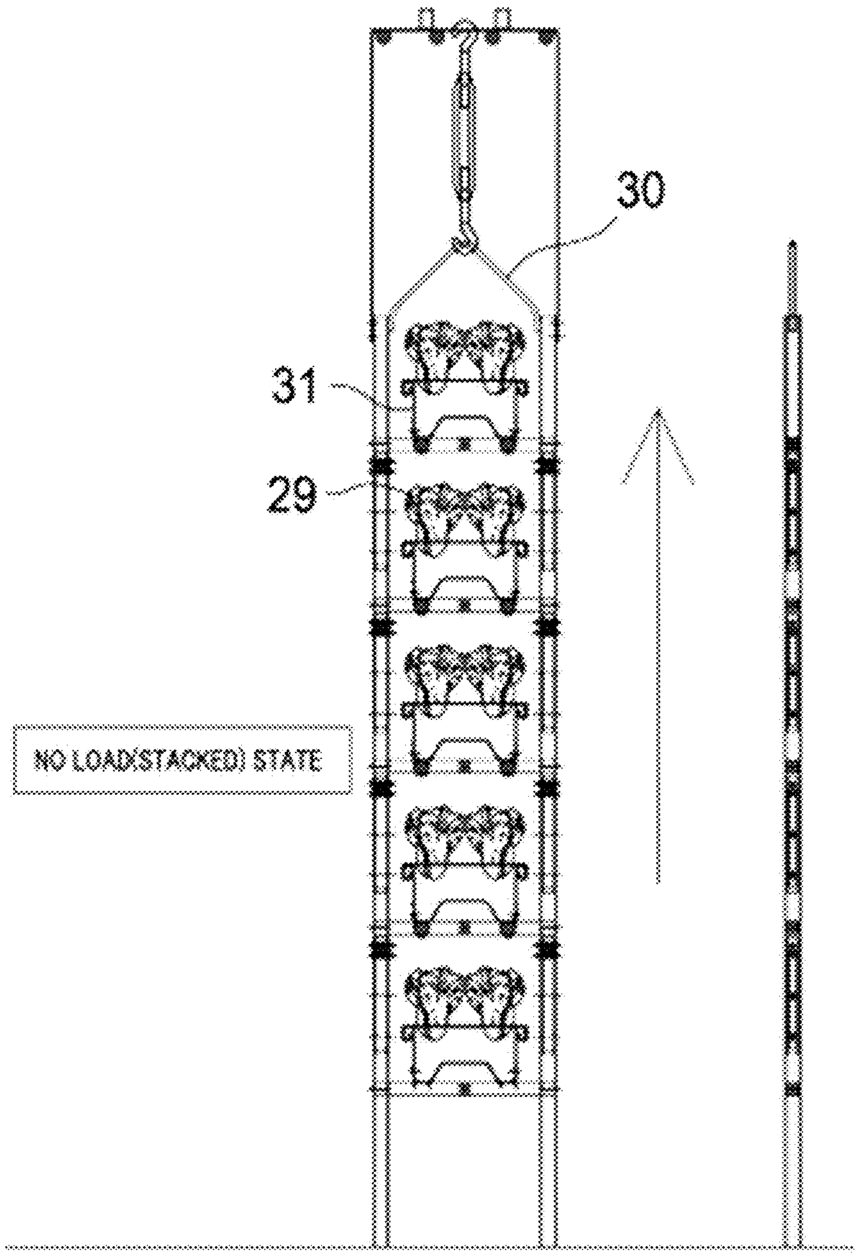

FIG. 1 is a view showing the overall configuration of a plant cultivation unit of the present invention, FIG. 2 is a view showing the configuration of a driving unit of the present invention, FIG. 3 is a view showing the unstacked state of the plant cultivation unit and the stacked state of a cultivation bed stack unit, FIGS. 4 and 5 are views illustrating a principle of balanced up and down movement of cultivation beds of the present invention, FIG. 6 is a view illustrating a wire fixing unit of the present invention, FIG. 7 is a detailed view showing the wire fixing unit of the present invention, FIGS. 8(*a*) to 8(*d*) are detailed views of portions A to D of FIG. 5, and FIGS. 9(*a*) and 9(*b*) are views showing an apparatus for adjusting a vertical spacing between cultivation beds of the present invention in a load state and a no load state, respectively, and, as shown in the drawings, a driving unit 100 is provided at the upper end of a structure formed by trusses 2, posts 2*b*, and a roof 2*a*, wire transfer units 200 are connected to the driving unit 100 to be operated, and plant cultivation units 300 and cultivation bed stack units 400 are connected to the wire transfer units 200 to be moved up and down by the wire transfer units 200.

A pinion gear 3 is installed in a motor die 1*a* at the upper end of the center of the trusses 2, and a driving motor 1 and a reduction gear 1*b* configured to rotate the pinion gear 3 are installed.

The driving motor 1 is connected to driving shafts 6 through driving shaft connectors 7 so that driving force generated by the driving motor 1 is transmitted through the driving shafts 6.

An upper rack 4 and a lower rack 5 are installed on the upper and lower parts of the pinion gear 3 and move rectilinearly to the left and right in opposition to each other by driving the pinion gear 3, upper wire transfer pipes 8 are connected to ends of the upper rack 4, and lower wire transfer pipes 9 are connected to ends of the lower rack 5.

Further, wire fixing parts 12 are installed at the upper wire transfer pipes 8 and the lower wire transfer pipes 9, and a plurality of holes formed in the wire fixing parts 12 is arranged in a straight line in a vertically symmetrical manner or arranged to be slightly inclined so that wires 11 are connected laterally to the wire fixing parts 12 in zigzags through the holes to withstand load by receiving force.

That is, the upper wire transfer pipes 8 are connected to the ends of the upper rack 4, and the wires 11 are firmly connected to the upper wire transfer pipes 8 through the wire fixing parts 12.

In addition, the lower wire transfer pipes 9 are connected to the ends of the lower rack 5, and the wires 11 are firmly connected to the lower wire transfer pipes 9 through the wire fixing parts 12.

The plant cultivation units 300 and the cultivation bed stack units 400 are connected to the left and right sides of the wires 11 through the upper wire rollers 13 and the lower wire rollers 14, and plants 29 are cultivated through each of gutters 31 stacked in the plant cultivation units 300 and the cultivation bed stack units 400.

The operation of the present invention configured as described above will be described below.

First, in the driving unit 100 of the present invention, the motor die 1*a* configured to receive the driving motor 1 therein is installed between the trusses 2, which are structures, and the driving motor 1 and the reduction gear 1*b* are connected to the motor die 1*a* so that the driving shafts 6 provided with the driving shaft connectors 7 at both sides are continuously installed on the shaft of the pinion gear 3.

Further, in the driving unit 100, the upper rack 4 is installed on the upper part of the pinion gear 3 and the upper wire transfer pipes 8 are installed on the ends of the upper rack 4, and the lower rack 5 is installed on the lower part of the pinion gear 3 and the lower wire transfer pipes 9 are installed on the ends of the lower rack 5.

The wire fixing parts 12 having the plurality of holes formed therein are installed at the upper wire transfer pipes 8, and the wires 11 are laterally inserted into the holes of the wire fixing parts 12 so that the wires 11 connected to the plant cultivation units 300 are fixed while withstanding load without moving even when the wires 11 rise and fall.

That is, the wire fixing parts 12 is configured such that three holes are arranged to face each other, as shown in FIG. 7, or are arranged to be slightly inclined, and the wire 11 is connected laterally to these holes in zigzags.

In addition, as unit to transfer the wires 11, two upper wire rollers 13 provided at the left and right sides are rotated while the wire 11 is fastened to the wire fixing parts 12 of the upper wire transfer pipe 8 and both sides of the wire 11 are deployed in opposite directions in the state in which the upper wire transfer pipe 8 is connected to the upper rack 4, and two lower wire rollers 14 are rotated while the wire 11 fixed to the lower wire transfer pipe 9 is fastened to the wire fixing parts 12 of the lower wire transfer pipe 9 and both sides of the wire 11 are deployed in opposite directions, thereby causing the plant cultivation unit 300 and the cultivation bed stack unit 400 to be raised and lowered.

Therefore, as shown in FIG. 3, the plant cultivation unit 300 forms an unstacked state, i.e., a heavy load state, and the cultivation bed stack unit 400 located therebelow forms a stacked state in which plants are stacked, i.e., a no load state.

Here, referring to FIG. 4, the upper rack 4 moves to the right and the lower rack 5 moves to the left based on the driving pinion gear 3, and due to the wire 11 fixed to the upper wire transfer pipe 8 connected to the upper rack 4, a cultivation bed Z1 fastened to the left upper wire roller 13 is raised, and a cultivation bed Z2 is lowered and stacked based on the wire fastening part 12 fastened to the right upper wire roller 13*a*.

In addition, due to the wire 11 fixed to the lower wire transfer pipe 9 connected to the lower rack 5 at the lower part of the pinion gear 3, a cultivation bed Z3 is raised through the right lower wire roller 14*a* based on the wire fixing parts 12, and a cultivation bed ZA fastened to the left lower wire roller 14 is lowered and stacked.

At this time, due to the lowered and stacked (no load) state of the cultivation bed Z2 connected to the upper wire transfer pipe 8, the raised (high load) state of the cultivation bed Z1 connected to the upper wire transfer pipe 8, the raised (high load) state of the cultivation bed Z3 connected to the lower wire transfer pipe 9, and the lowered and stacked (no load) state of the cultivation bed Z4 connected to the lower wire transfer pipe 9, in the structures coupled to the driving pinion gear 3 and the upper rack 4 and lower rack 5 coupled to the upper and lower parts of the driving pinion gear 3, depending on the lowering of the cultivation bed Z2 connected to the upper rack 4, the raising of the cultivation bed Z1 connected to the upper rack 4, the raising of the cultivation bed Z3 connected to the lower rack 5, and the lowering of the cultivation bed Z4 connected to the lower rack 5, the horizontal load of the cultivation beds causes the upper rack 4 to rectilinearly move to the left and the lower rack 5 to rectilinearly move to the right, when the driving pinion gear 3 is rotated in the leftward direction, and due to load neutrality of the driving pinion gear 3, the power of the driving motor 1 may be minimized by the seesaw principle when the driving motor 1 rotates depending on the raising and lowering of the respective cultivation beds Z1-Z4.

In addition, the height of the cultivation beds in multiple layers is 2-4 m, and in order to achieve sufficient raising and lowering and stacking of the cultivation beds, the transfer length, i.e., the stroke distance, of the cultivation bed Z1 and the cultivation bed Z2 must exceed a spacing between the wire rollers 13 14 on both sides thereof to ensure smooth transfer without mutual interference.

In the present invention, as shown in FIG. 5, an upper pipe roller 15 and a lower pipe roller 15*a* may be provided so that the upper and lower wire transfer pipes 8 and 9 move rectilinearly in position, and upper and lower wire roller separation prevention pins 16 and 17 may be provided so that the wires 11 connected to the upper and lower wire transfer pipes 8 and 9 are not separated therefrom.

FIGS. 8(*a*) to 8(*d*) are front, plane, and side views showing detailed configurations of the upper and lower wire rollers 13 and 14 in portions A, B, C, and D of FIG. 5.

Hereinafter, an operation of adjusting a vertical spacing between gutter holders 33 of the present invention will be described.

Figure 10:
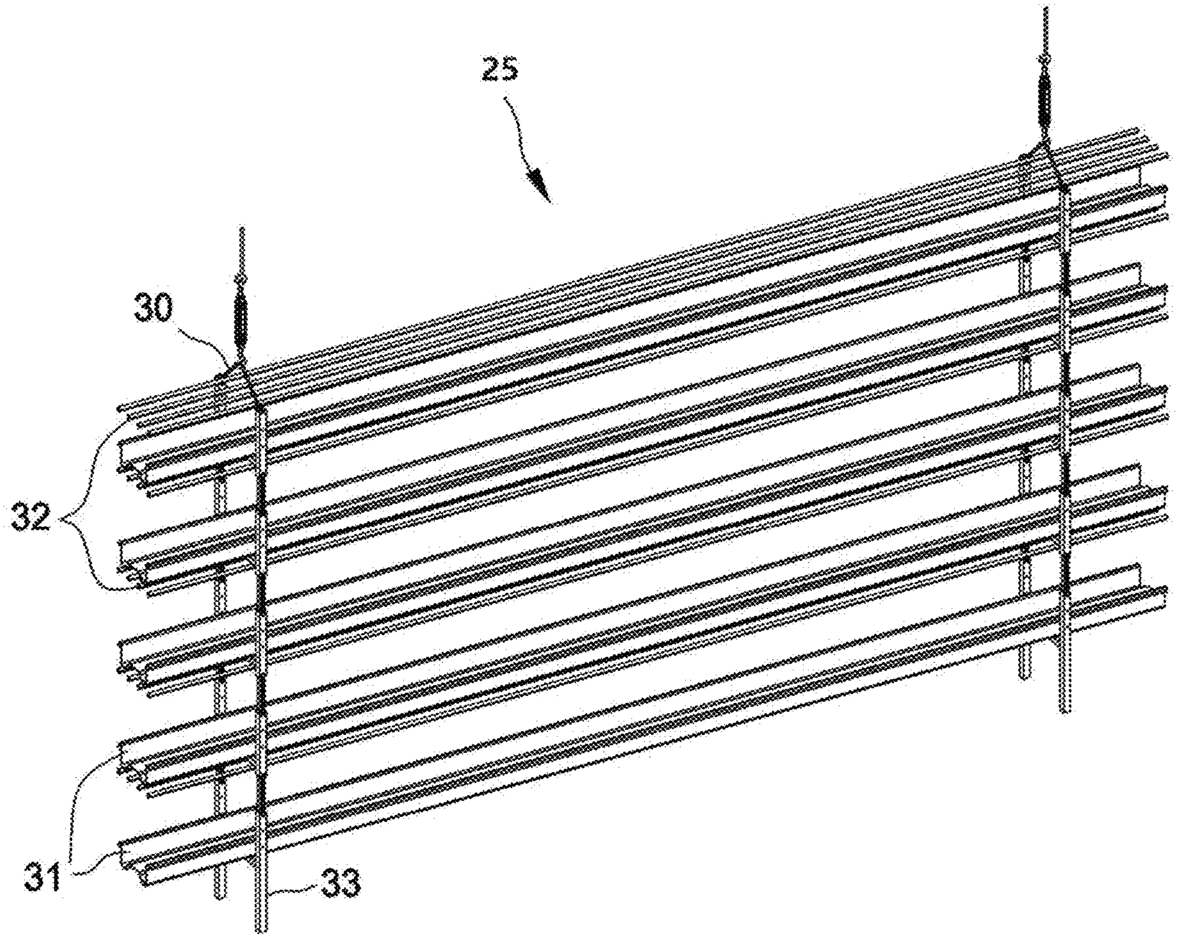
FIG. 10 is a perspective view of the cultivation bed of the present invention.
Figure 11:
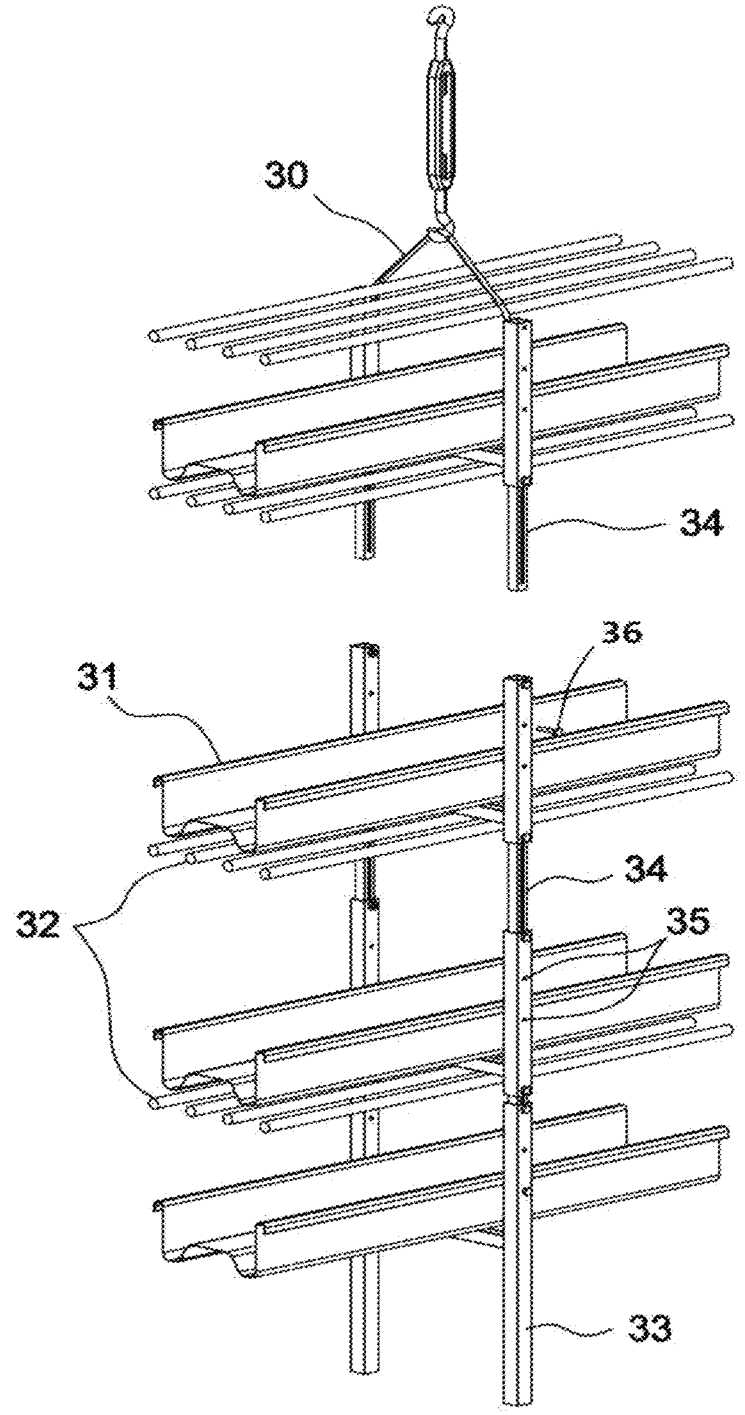
FIG. 11 is an exploded perspective view of the cultivation bed of the present invention.
Figure 12:
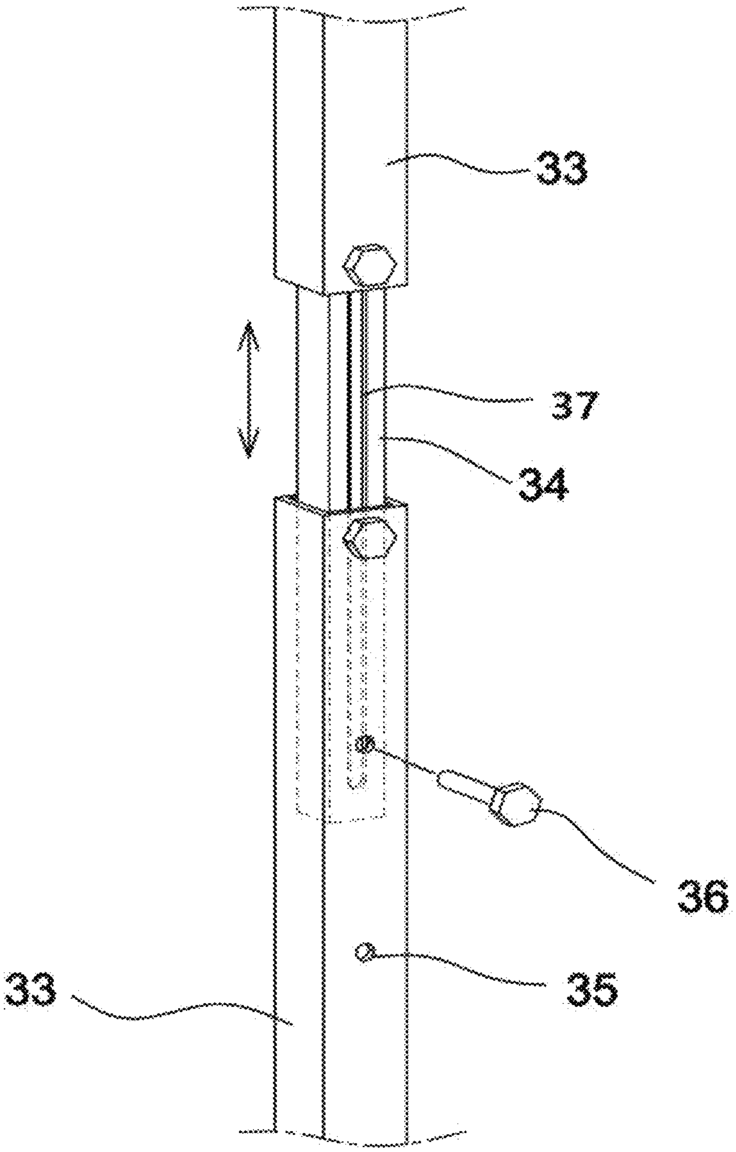
FIG. 12 is a view illustrating adjustment of a vertical spacing between gutter holders of the present invention.

FIGS. 9(*a*) and 9(*b*) are views showing an apparatus for adjusting a vertical spacing between the cultivation beds of the present invention, FIG. 10 is a perspective view of the cultivation bed of the present invention, FIG. 11 is an exploded perspective view of the cultivation bed of the present invention, and FIG. 12 is a view illustrating adjustment of the vertical spacing between the gutter holders 33 of the present invention, and as shown in the drawings, gutters 31 which may have plants 29 located therein side by side are installed to be stacked with a certain distance therebetween, and LEDs 32 configured to supply light to the plants 29 are installed at the bottoms of the gutters 31 horizontally with the gutters 31, and the gutter holders 33 are installed vertically on both sides of each gutter 31 and LED 32.

FIG. 9(*a*) is a view showing a load state, FIG. 9(*b*) is a view showing a no load state (stacked state), and the cultivation bed is configured such that the spacing between the gutter holders 33 is decreased in the early stage of plant cultivation and the spacing between the gutter holders 33 is increased at harvest time so as to improve energy efficiency and save electricity.

As shown in FIG. 10, the cultivation beds 25 stacked in multiple stages by the gutter holders 33 so that the plants 29 planted in the gutters 31 grow with light received from the LEDs 32.

Conventionally, the vertical spacing between the cultivation beds 25 was fixed to a certain distance, and thus even if the height of the cultivation beds 25 was to be adjusted depending on the growth status of plants, the vertical height of the cultivation beds 25 could not be adjusted, making it difficult to utilize a space because the gutter holders 33 was fixed, and in order to solve this problem, in the present invention, the vertical spacing between the gutter holders 33 of the cultivation beds 25 may be increased or decreased as needed to adjust a stacking spacing between the cultivation beds 25.

Therefore, in the early stage of plant cultivation, if a spacing between the LEDs 32 and the plants 29 becomes far, energy efficiency is lowered and it is insufficient to promote growth of the plants 29, and therefore, if the spacing between the gutters 31 is decreased by decreasing the spacing between the gutter holders 33, the LEDs 32 located at the bottom of an upper gutter 31 become closer to the plants 29 in a lower gutter 31, thereby being capable of more actively promoting growth and development of the plants 29 in the early stage of plant cultivation as well as improving energy efficiency.

Here, in the state in which the vertical spacing between the gutter holders 33 is constant, for example, when first-year plants are cultivated, if a spacing between the first-year plants and the LEDs 32 is long, the energy efficiency of the LEDs 32 is reduced and thus energy consumption increases.

FIG. 12 shows the gutter holders 33 of the present invention, a transfer link 34 is inserted into the upper and lower gutter holders 33 which are hollow, a long hole 37 is vertically formed in the transfer link 34, and a plurality of stop pin holes 35 is formed in the gutter holders 33 so that a stop pin 36 is selectively inserted into one of the stop pin holes 35 of the gutter holders 33 to adjust the height of the gutter holders 33.

If it is desired to decrease the spacing between the plants 29 and the LEDs 32 by decreasing the vertical stacking spacing of the cultivation beds, the stop pin 36 is selectively inserted into one of the stop pin holes 35 at a desired position among the plurality of stop pin holes 35 formed in the gutter holders 33, and then, the stop pin 36 is fixed to the long hole 37 of the transfer link 34 to adjust the spacing between the gutter holders 33 due to the transfer link 34, thereby being capable of adjusting the spacing between the plants 29 and the LEDs 32.

However, in the state in which the transfer link 34 is fixed to the lower part of the upper gutter holder 33, the transfer link 34 is inserted into or removed from the lower gutter holder 33, thereby adjusting the height of the gutter holders 33.

When the spacing between the gutters 33 and the LEDs 32 is decreased by reducing the vertical spacing between the gutter holders 33, growth of the plants 29 located in the gutters 31 may be promoted.

That is, in the present invention, a plurality of stop pin holes 35 configured to adjust the height of the gutter holders 33 that may adjust a spacing between several cultivation layers is formed in the gutter holders 33, and after stacking, the transfer link stop pin 36 is inserted into the lowermost stop pin hole 35 of the lower gutter holder 33 so that the spacing between the cultivation layers is small in the early stage of growth of plants, and the position of the transfer link stop pin 36 is adjusted so that the spacing between the cultivation layers may be increased as the plants grow, thereby being capable of realizing energy saving and production convenience.

As is apparent from the above description, the present invention provides an apparatus for adjusting vertical spacings between plant cultivation units and gutter holders that, when cultivating plants in multiple stages in height with sunlight or LED light in a greenhouse or a general commercial structure, lowers an upper-stage plant cultivation unit to the floor using upper and lower racks, and a pinon gear, a driving motor, and a reduction gear which are installed between the upper and lower racks, while maintaining the balance of the cultivation beds, so that workers are capable of harvesting plants located in an upper stage in a natural posture without using a height-adjusting lift or a ladder, thereby being capable of improving productivity and maximizing manpower-saving effects.

Further, the apparatus according to the present invention adjusts the height of the gutter holders in the state in which the plant cultivation unit is lowered by the pinion gear and the upper and lower racks, so that the vertical spacing between the gutter holders is arbitrarily adjusted depending on the growth conditions of plants planted in the gutters, thereby allowing LED light to come closer to the plants in the early stage of plant cultivation to allow the plants to grow quickly, and allowing the LED light to be appropriately spaced apart from the plants as the plants grow, and thus being capable of improving energy efficiency and preventing power loss.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An apparatus for adjusting vertical spacings between plant cultivation beds and gutter holders movable up and down, the apparatus comprising:

an upper rack and a lower rack;

a pinion gear disposed between the upper rack and the lower rack;

a driving motor and a reduction gear connected to the driving motor, the driving motor and the reduction gear being configured to drive the pinion gear;

upper wire transfer pipes connected to respective ends of the upper rack;

lower wire transfer pipes connected to respective ends of the lower rack;

wires connected to the upper and lower wire transfer pipes and to the respective plant cultivation beds; and upper and lower wire rollers engaged with the wires, wherein the plant cultivation beds are configured to be stacked in multiple stages, wherein the upper rack and the lower rack are configured to move rectilinearly in opposite directions with respect to the pinion gear in response to rotation of the pinion gear, wherein the upper and lower wire transfer pipes, the wires, and the upper and lower wire rollers are configured to raise and lower the respective plant cultivation beds in response to the rectilinear movement of the upper rack and the lower rack, and wherein the upper rack is coupled to a cultivation line of an upper layer and a cultivation line of a lower layer on a floor surface, and the lower rack is coupled to the cultivation line of the upper layer and the cultivation line of the lower layer on the floor surface, the upper rack, the lower rack, the wires, and the upper and lower wire rollers being configured to move the cultivation beds up and down in directions opposite to each other while maintaining balance with forces symmetrical to each other with respect to the pinion gear.

2. The apparatus according to claim 1, wherein the upper and lower wire transfer pipes are connected to the respective ends of the upper rack and the lower rack, and wherein the wires are connected to the upper and lower wire transfer pipes through the upper and lower wire rollers by guiding and moving the upper and lower wire transfer pipes rectilinearly to respective grooves of an upper pipe roller and a lower pipe roller, so that the plant cultivation beds are moved up and down while maintaining force balance.

3. The apparatus according to claim 2, wherein wire fixing parts having a plurality of holes are formed in the upper and lower wire transfer pipes, and the wires are laterally connected to the plurality of holes of the wire fixing parts, so that the wires are fixed to the upper and lower wire transfer pipes to prevent separation of the wires from the upper and lower wire transfer pipes.

4. The apparatus according to claim 3, wherein the plurality of holes are arranged in a straight line in a vertically symmetrical manner or are inclined so that the wires are connected to the holes in zigzags.

5. The apparatus according to claim 1, wherein a first one of the cultivation beds in a lowered and stacked state is connected to the upper wire transfer pipe, a second one of the cultivation beds in a raised state is connected to the upper wire transfer pipe, a third one of the cultivation beds in a raised state is connected to the lower wire transfer pipe, and a fourth one of the cultivation beds in a lowered and stacked state is connected to the lower wire transfer pipe, the first to fourth cultivation beds being configured to balance each other's forces.

6. The apparatus according to claim 1, wherein upper and lower wire roller separation prevention pins are installed on the upper wire rollers and the lower wire rollers, respectively, to prevent separation of the wires connected to the upper and lower wire transfer pipes.

7. The apparatus according to claim 1, wherein the upper rack is configured, when gutters of the cultivation beds are in an unstacked state, to move rightward relative to the pinion gear such that the upper wire transfer pipes move rightward and the wires move through the upper wire rollers, thereby lowering one of the cultivation beds and raising another of the cultivation beds.

* * * * *